United States Patent [19]

Kehl et al.

[11] 4,135,155
[45] Jan. 16, 1979

[54] SYSTEM AND METHOD FOR DETERMINING VEHICLE GROUND SPEED

[75] Inventors: Albin Kehl, Stuttgart; Hans-Georg Müller, Ditzingen; Friedrich Scharf, Stuttgart, all of Germany

[73] Assignee: Robert Bosch GmbH, Stuttgart, Germany

[21] Appl. No.: 832,570

[22] Filed: Sep. 12, 1977

[30] Foreign Application Priority Data

Sep. 28, 1976 [DE] Fed. Rep. of Germany ....... 2643524

[51] Int. Cl.$^2$ .............................................. G01P 3/66
[52] U.S. Cl. .................................. 324/178; 250/222 R; 180/105 E; 246/187 B
[58] Field of Search .................... 324/178; 73/167; 250/222 R, 209; 180/98, 105 E; 246/182 A, 187 B; 340/309.4; 346/38

[56] References Cited

U.S. PATENT DOCUMENTS 3,649,818  3/1972  Sylvander et al. ............. 324/178 X
3,885,873  5/1975  Andermo ........................ 356/28

Primary Examiner—Stanley T. Krawczewicz
Attorney, Agent, or Firm—Flynn & Frishauf

[57] ABSTRACT

A plurality of sensors are located on one of the bodies, staggered by fixed distances from each other along the direction of relative movement. The sensors are responsive to a characteristic of the other body, for example to surface characteristics of a roadway. A sensed signal, picked up by a first, or leading sensor is time delayed for a predetermined time interval, and compared with signals received from all the other sensors. Upon optimum correlation, and with known time delay and distance between sensors, the relative speed can then be indicated by determining which one of the sensors picked up the signals which matched the time delay signal. The amplitudes of the signals can be dynamically equalized and the time delay itself changed to permit output over wide ranges, or with respect to different scaling units.

22 Claims, 1 Drawing Figure

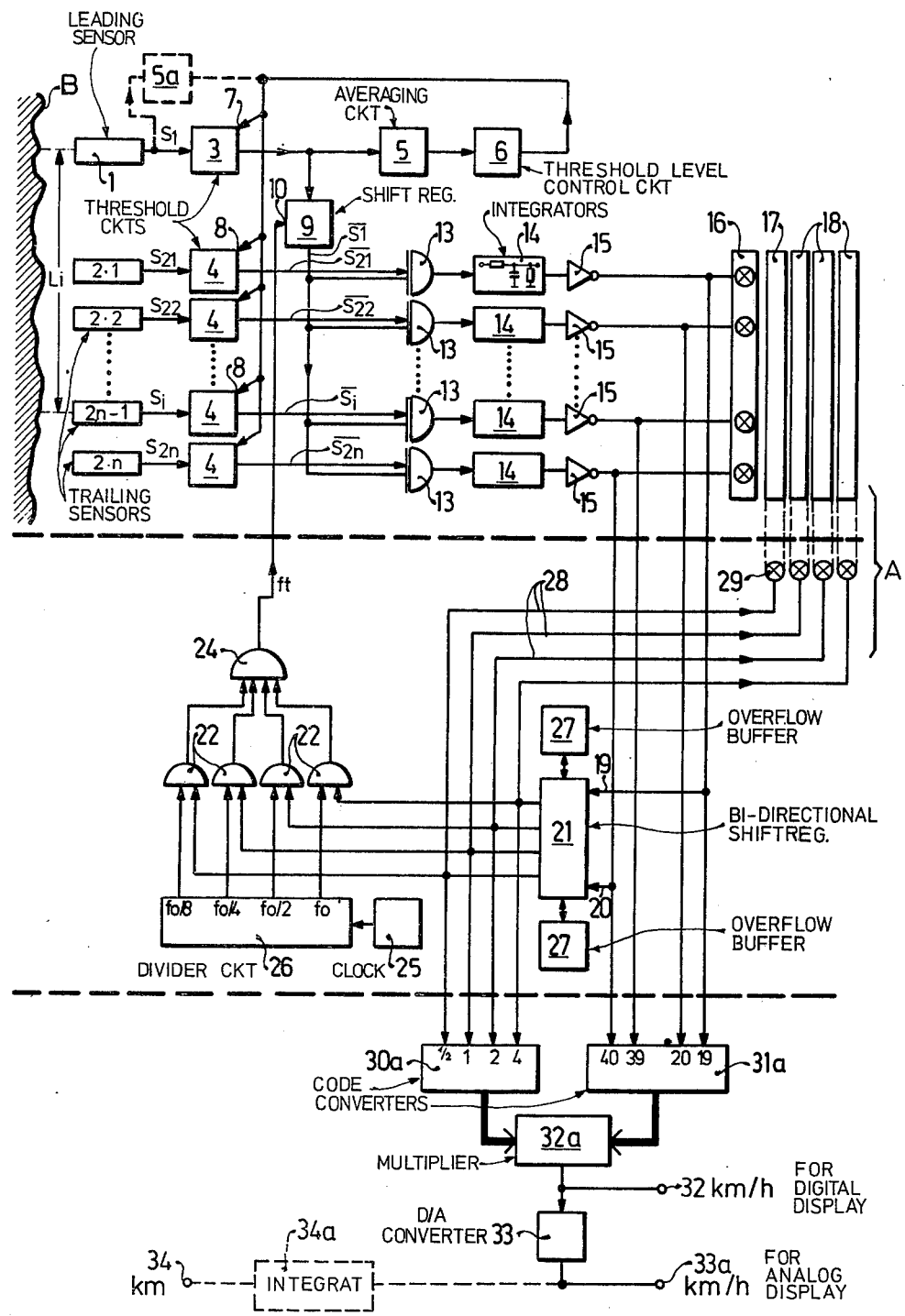

SYSTEM AND METHOD FOR DETERMINING VEHICLE GROUND SPEED

CROSS REFERENCE TO RELATED PRIOR ART

German disclosure documents DT-OS Nos. 2 133 942; 2 219 943; 2 331 145; 2 219 343; 2 219 900.

The present invention relates to the determination of relative speed between two bodies, for example to determine the ground speed of a vehicle without contact between the two bodies, and more particularly to a system in which a sensor array located on one of the bodies is responsive to characteristics of the other, for example surface characteristics of a roadway, and provides output signals therefrom.

It has previously been proposed to determine relative speed between two bodies in which signals which are to be compared, or to be correlated, are quantitized in limiting circuits—see, for example, the cross referenced German disclosure document DT-OS No. 2 133 942. In accordance with this system, the signal derived from the first, or leading sensor is time delayed by a delayed time which is so adjusted that the mean squared deviation of the signal from another sensor is a minimum. The time delay is controlled by an interval controller. The interval controller must carry out a comparatively complex computation and, therefore, is quite complex itself. The other cross referenced German disclosure documents also disclose systems and methods and determine relative speed between two bodies. All the systems and methods have as a common feature that the delay of the output signal of the leading sensor is controlled in a regulator or controller network. Such a network requires complex circuitry which have to accurately reflect the characteristics of proper operation of closed control loops. Undesired or spurious oscillations must be suppressed while the control loop response must still be held to a minimum. This is frequently possible only by means of additional circuits, such as rate-responsive controllers or controllers in which a coarse control cooperates with a fine control in order to prevent swinging in of a control loop to an erroneous value.

Subject Matter of the Present Invention

It is an object of the present invention to provide a method and apparatus to determine speed between two movable bodies, without contact between the bodies, which is simple, does not require complex circuitry or sensitive control loops and permits measurement of wide speed differences while being responsive to rapid changes in speed.

Briefly, a plurality, or group or array of sensors is located in longitudinally staggered alignment on one of the bodies, for example a vehicle, the array being so connected that the plurality of sensors which trail the first or leading sensor provide output signals which are substantially time delayed. All these output signals, delayed with respect to the first or leading one, are compared with the first leading output signal which, in turn, is time delayed by a predetermined time interval. The time delayed first signal is then compared with all the other signals from all the other transducers and optimum correlation of these signals from any one of the transducers then will provide an output indication of the speed, if the distance between the staggered sensors is known and the time delay of the first signal is known.

The apparatus, and method thus differs from the known systems in that, in any instant of time a group of signals of the array is provided—derived from all the trailing sensors—which are differently time delayed with respect to the signal of the first or leading sensors; and each one of these signals is instantaneously compared with the fixed delay signal of the first or leading sensor in order to determine that one of the pair of signals which provides for optimum correlation. Thus, the complex and troublesome approach to determine the correct delay time of a control loop is avoided. Simultaneously, changes in speed will be rapidly and reliably sensed without danger of erroneous measurements, oscillations in a control loop, or delayed response thereof. Control loops which are subjected to rapid swings of the command value may lose command if the control time constants are too long.

In a preferred form the signals of the sensors are processed to become binary signals. This feature, as such, has been proposed already in the cross referenced DT-OS No. 2 219 900. The binary signals, which are single-digit binary signals are then compared by means of logic circuits. Analog integrator circuits are connected to the logic output. This arrangement is particularly suitable for processing the signals derived by the system of the present invention since a minimum of circuitry is required to obtain useful outputs.

Drawing, illustrating an example and showing a schematic block circuit diagram of a preferred embodiment of the system which carries out the method of the present invention.

The upper left hand portion of the FIGURE shows in highly schematic form a surface region of a body B, for example the surface of a roadway. All the components of a system in accordance with the present invention are located on the other body which has been given the general designation A. For simplicity, a schematic representation of the other body has been omitted. The system is applicable to measure ground speed of a vehicle, which may be a road vehicle, an aircraft, or the like.

The circuit located on the body A has a sensing array, or group which includes a plurality of sensors responsive to a surface characteristic on the body B. The first one or leading sensor 1 is located at the leading end of the body A. The remainder of the array, forming a second group of sensors is composed of a plurality of sensors 2.1, 2.2 ... 2.n−1; 2.n. The distances between the leading sensor 1 and any one of the other sensors 2.1, 2.2, ... 2.n is predetermined and known. The distance between the sensor 1 and the sensor 2.n−1 is shown as Li. The outputs of the sensor 1 and 2.1 to 2.n are connected to respective threshold circuits 3, 4. The output signal of the threshold circuit 3, which is a sequence of binary 0 and 1 signals is connected to a shift register 9. The shift register 9 time delays the signal sequence derived from the output of the threshold circuit 3 by a delayed time $\tau_0$. The output of the shift register 9 is indicated as $\bar{s}_1$, and represents the time delayed signal derived from the leading sensor 1. The digitized output signals derived from the threshold circuits 4 of the respective sensors 2.1 ... 2.n of the trailing group or array of sensors are indicated at the respective lines by $\bar{s}_{21}$, $\bar{s}_{22}$ ... $\bar{s}_i$, $\bar{s}_{2n}$.

The outputs of the sensors of the trailing group of sensor arrays, and digitized by the threshold circuits 4 are each connected to one input of an EXCLUSIVE-OR gate 13. The output of the shift register 9 is connected to the second input of the respective EXCLU- SIVE-OR gate 13. The output of each one of the EXCLUSIVE-OR gate 13 is connected to a respective integrating circuit 14 which, as schematically shown in the FIGURE, may be merely a R/C network. The outputs of the integrating circuits 14 are connected to a respected inverter 15, the outputs of which are connected to an indicator, such as an indicating lamp 16, or the like. The lamps 16 are associated with a scale 17 on which speed values are indicated. When the respective lamp 16 lights, a speed value on scale 17 will be illuminated.

Operation, and method to determine relative speed: the respective distances between the leading sensor 1 and the respective trailing sensors of the group or array of trailing sensors 2.1 ... 2.n is known; one of the distances is indicated by the distance arrow Li. The sensors which, for example, may be photo cells or the like provide output signals representative, for example of a changing reflection of the surface B and scan a point, or a small incremental area on the surface B. Irregularities in the reflectivity, of the surface configuration of the surface B then provide output signals $s_1$, $s_{21}$, $s_{22}$ ... $s_i$, $s_{2n}$ which vary with time, that is, the respective output signals are functions of time so that, for example, the output signal from the sensor $2n-1$ will be, with respect to time, $s_{i(t)}$. The signals of the trailing sensors will have, essentially, the same wave shape or form as the signal $s_1$ from the leading sensor 1, and are time shifted with respect to the signal from the leading sensor by a time $T_i$ which is necessary for the respective sensor to pass through the associated distance Li. If the distance Li is known—which, of course, it is since it corresponds to the distance between the sensors—and the time shift between the signal picked up by sensor 1 and a sensor $2.n-1$ can be determined, the speed v between the body A and a body B will be obtained from the well known relationship $v=L/T$.

In accordance with the present invention, the time shift T is determined by time delaying the signal derived from the first sensor 1 and then comparing the time shifted signals derived from the various sensors 2.1 ... 2.n with the time delayed signal derived from sensor 1. The comparison is effected by the EXCLUSIVE-OR gates 13, singly, by comparing the delayed digitized signal $\overline{S}_1$ of the leading sensor 1 derived from the output of the shift register 9 with all of the time shifted, digitized signals $\overline{S}_{21}$ ... $\overline{S}_n$ derived from the trailing array of sensors 2.1 ... 2.n. If this comparison of the two signals of a signal pair is positive, that is, provides an indication that the signals are essentially the same, then one has determined that the time delay $\tau_0$ is equal to the time required for the object or body A to move from the position in which the leading sensor senses the particular signal to the particular sensor which does provide the correlation signal—that is, the time $\tau_0$ will be equal to the time Ti required by the body A to pass over the distance Li. This operating or moving time, according to the well known above referred to equation is associated with a fixed speed.

The circuit in accordance with the present invention provides that the output of the EXCLUSIVE-OR gates 13 is a 1-signal only if the signals at both inputs are different. These signals are integrated in the integrator 14 which then control the subsequently connected inverters 15 in such a manner that the associated indicators 16 will not light. Only that output of the EXCLUSIVE-OR gate 13 will have a zero value in which both inputs are equal. The respectively connected integrator 14 and inverter 15 will then cause the associated indicator lamp 16 to light.

The condition may arise that two EXCLUSIVE-OR gates 13 will have a zero output since, for a short period of time, the input signals of two gates will be the same. As a result, two indicators 16 will respond. This condition may occur only if the actual moving time T is exactly between the time Ti associated with two adjacent sensors of the sensor array or sensor group. In all other conditions, in which the moving time T is not identical to the theoretical time Ti, a definite speed indication will be obtained by optimum choice of the threshold values of the inverter 15 and of the time constant of the integrator 14.

The circuit, as described so far, permits measurement of speed within a predetermined range which is determined by the time constant $\tau_0$. As is clearly apparent, the equation $v_i = L_i/\tau_0$ is applicable with respect to the speed sensed by a specific sensor of the distance Li from the leading sensor, and $v_i$ is the speed associated with the respective channel with which the specific respective sensor of the trailing group of sensors is associated, including also the associated EXCLUSIVE-OR gates 13 and the subsequent evaluation circuit including the integrator, inverter and indicator. Coincidence of the two signals of a signal pair can be obtained only if the respective moving time $T_i$ is equal to the time constant $\tau_0$, which is the time by which the signal $s_1$ of the first sensor is time delayed. The accuracy of measurement within this range depends on the number n of the sensors located behind the leading sensor 1—excluding errors of measurement—and by the capability of resolution of the subsequently connected circuits. The absolute value of the constant $\tau_0$ is dependent on the shift frequency ft of the shift register, introduced at terminal 10 of the shift register 9.

In accordance with a feature of the invention, a range switching can be obtained easily by changing the clock or shift frequency of the shift register 9, that is, by changing the frequency ft. This change-over can be obtained automatically.

Referring again to the FIGURE: the outputs of the first and last inverters 15, that is, the outputs which correspond to the lowest speed or the longest possible moving time, $T_n = \tau_0$ and the output derived from the highest speed, that is, the lowest possible moving time $T_1 = \tau_0$ are tapped and connected to two inputs 19, 20 of the bi-directional shift register 21. The bi-directional shift register 21, in the example illustrated, is a four digit or four position shift register. A binary 1 is placed in one position of the shift register. This binary 1, when the upper or lower range of a measuring region is reached, is shifted down by one step. In the circuit shown, the binary 1 is shifted downwardly when applied to input 19, and shifted upwardly when applied to input 20. The bi-directional shift register 21 has four outputs, each one connected to and input of a respective one of four AND gates 22. The second input of the respective AND gates 22 is connected to the output of a divider circuit 26, the input of which is connected to a clock generator 25. Clock generator 25 provides clock signals for the shift register 9, the clock signal frequencies being divided in the divider circuit 26 into four frequencies fo, fo/2, fo/4, and fo/8. The outputs of the AND gates 22 are connected through a buffer OR gate to the shift or clock input 10 of the shift register 9. The bi-directional shift register 21 commands energization of only one of the respective AND gates 22 so that only one of the respective frequencies derived from the divider circuit 26 will be applied to the shift register 9.

The bi-directional shift register 21 may, of course, have any suitable number of shifting positions, depending on the number of measuring ranges desired, that is, depending on the number of divisions of frequencies of the divider circuit 26 which are to be controlled. The outputs of the bi-directional shift register 21 are furthermore connected through output line 28 with indicator lamps 29 which are used to control illumination of the respective scale 17, and three further scales 18, or placement of the respective scale 17 or the one selected scale 18 in indicating relationship to the indicators 16. The bi-directional register 21 which contains binary 1, thus causes illumination of only one of the scales 17, 18, respectively, resulting in unambiguous association of the respective indicator 16 and the speed marker of the respective scale 17, 18. Speeds beyond the speed indication ranges of the system cannot be indicated. It is therefore desirable to prevent that the binary 1 in the shift register can be lost due to it being shifted out. Thus, the bi-directional shift register has two inputs connected to overflow buffers 27, respectively connected to each one of the directional inputs of the bi-directional shift register, in which the binary 1 can be stored as an overflow if the measuring range is exceeded, until the speed of body A with respect to body B again has fallen within the indicating range provided by the system. The overflow buffer 27 closest to input 19 is also used to store a binary 1 at the position of the shift register 21 which corresponds to the lowest speed upon starting of the system.

The measuring ranges can also be switched over manually; additionally to the automatic switchover, manual overrides and manual interference in the speed switchover circuit can be provided, particularly to provide for manual association of a respective clock frequency with the shift register 9, and the appropriate associated respective output scale, if there should be malfunction in the bi-directional shift 21 and its associated circuit.

The system, in accordance with a further feature of the invention, includes an additional transposition circuit which is provided to process the signals derived from the measured speed to obtain electrical signals which can be used for further processing, for example for integration to provide an elapsed distance measurement, or a digital speed output.

Two code converter 30a, 31a are connected, respectively, to the outputs of the shift register 21 and to the outputs of the inverters 15. The code converters, preferably, are diode transfer matrix circuits. They are connected to a digital multiplier 32a which, in turn, is connected to an output terminal 32 and to a digital/analog (D/A) converter 33, having an output 33a. An analog signal representative of speed can be derived from terminal 33a. Terminal 33a can be connected to an integrator 34a, having an output 34 for which an output representative of elapsed distance can be obtained. The numbers which are introduced into the two code converters 30a, 31a provide outputs which, with the respective numbers at the inputs, provide for direct reading from the multiplier in a desired unit, for example in kilometers per hour at terminal 32, knots, or the like, by suitably matching the clock frequency from clock 25, and the respective division ratios, as well as the distances L between the leading sensor 1 and the subsequent trailing sensors 2.1 ... 2.n, respectively.

In accordance with a feature of the invention, the binary values 0 and 1 of the quantitized signals $\bar{s}_1, \bar{s}_{21} \ldots \bar{s}_{2n}$ should be distributed essentially uniformly with respect to a time average, in spite of changing conditions of the surface being sensed by the respective sensors. To provide for weighting, or normalizing the signals, a dynamic level setting circuit, or control circuit is provided connected between the output of the threshold circuit 3 and the input to the threshold circuits 4, to control threshold level thereof. The control loop includes an averaging circuit 5, forming an average value and a threshold level control circuit connected thereto and controlled by circuit 5. The averaging circuit 5 is a circuit of very long time constant and controls the threshold level control circuit 6 to provide a suitable output circuit, or change of the level setting control thereof if one of the binary values, for example 0, has a clear preponderance with respect to the other binary value, then 1, during a predetermined and substantially extensive time interval. The threshold level control circuit 6 is so controlled by the averaging circuit 5 that the output thereof sets the threshold values of the threshold circuits 3 in such a manner that the levels are shifted so that the relationship between the occurrence of a binary 0 and a binary 1 is approximately evenly distributed. The circuit 6 controls both the threshold circuit 3 as well as the threshold circuits 4 connected to the sensors 2.1 ... 2.n, so that the respective sensing channels will be similarly normalized.

An additional averaging circuit may be used, as shown in broken lines, connected to the output of the leading sensor 1. A circuit 5a, which is an integrator of long time constant is connected to the output of the leading sensor 1, and provides a suitable output signals to the inputs 7, 8, setting the level control of the threshold circuits 3, 4, respectively. Circuit 5a can readily be omitted, or substituted for the circuit comprising the averaging circuit 5 and the threshold level setting circuit 6. The circuit 5a evaluates the time average of the analog signal $s_1$, derived from the leading sensor 1 to thus control the threshold level by affecting the level set of the threshold circuits 3, 4, respectively.

Relating the association of the occurrence of binary 0 and binary 1 to the signal amplitude in dependence of the average signal amplitude at the output of at least one of the sensors—for example the leading sensor 1, as shown—permits normalizing the response of the circuit with respect to slow changes in the physical structure of the second body B. Such slow changes may, for example, be slow changes in the surface configuration thereof, for example the surface configuration of a roadway in order to improve the accuracy of the speed measurement obtained.

The delay circuit formed by the shift register 9 is a simple component. The overall system has the advantage that it does not require any complex control loops, or control loop circuits which introduce the difficulties, referred to above, of loop stability. Rather, the circuit components required by the system are simple and readily available integrated circuits, which correlate that pair of signals which has optimum correlation, and in which the signal pairs are easily obtained—one signal by time delaying the output from the leading sensor, and the other signal by obtaining a digitized sensor output signal. Comparison of the signals for optimum similarity, or correlation is simple and can be easily carried by known circuits.

The threshold circuits 4 permit, in accordance with the present invention, processing of the signals purely in digital form. This has the advantage that the entire system is substantially less subject to interference or noise or stray signals which may occur when processing signals in analog form; additionally, providing digital signals for eventual processing permits full use of modern semiconductor and integrated circuit technology, and the use of standard digital components. The integrating circuit 14 can be simple R/C circuits, individually matched to the respective delay times in such a manner that the integrating time is selected to be shorter with slow delay times and the integrating time is selected to be longer with longer delay times. The integrators 14, thus, can be additionally controlled by the output from OR gate 24 to have a changeable or variable integration time so that the integration time of the respective integrators 14 can additionally be matched to the time delay rate in circuit 9, as determined by the clock frequency ft applied thereto from the divider circuit 26. This control connection has not been shown in the drawing for simplicity.

Using EXCLUSIVE-OR gates for the gates 13 permits use of standard integrated circuit elements readily permitting integration of the output signal, as well as processing of signals in which the inputs to both input terminals of the respective gate have the binary value 0. Additionally, time intervals can be sensed in which the signals at the input terminals to the respective gates both have the binary value 1. This additionally decreases the time necessary for a decision output to be obtained whether the signals to be compared have the same characteristic.

The time delay circuit 9 can be any kind of electronic time delay circuit customary in the art; a shift register is preferred, however, because the delay time can be changed so easily by changing the clock rate, that is, the shifting rate of the shift register by changing the clock frequency ft applied thereto, as explained in connection with the circuit arrangement 25, 26, 22, 24. Range switching is thus simple and permits reduction of the number of sensors of the sensor group 2.1 ... 2.n located in trailing position with respect to the leading sensor 1. In a preferred form of the invention, the range switching is done automatically, as described. The measuring ranges controlled by the bi-directional shift register 21 are preferably so selected that they provide for partial overlap so that a certain speed which is close to one end of the measuring range of a scale does not result in constant switchover from one scale to the other. The indicator element 16 may simply be indandescent lamps, or other visually illuminated indicators connected to the outputs of the integrators 14 through respective inverters 15—unless the integrators 14 already provide an inverted output. An additional logic circuit can be connected between the output of the respective integrator 14 and the input to the indicator 16—in advance or behind the inverter 15—and having a suitable threshold value to provide for positive ON-OFF illumination of the indicator 16. The indicator 16, preferably in the form of luminous elements, are located along a fixed scale on which the respective speed values are indicated, with switchover for illumination, or indication with respect to the selected scale 17, or 18—as commanded by shift register 21—being provided. Similar systems to provide multiple scale output by scale control from one input, schematically indicated by lamps 29 and particular individual output commanded by the respective lamp 16 can be used.

The integrator 34a connected to the output of the D/A converter 33 provides a summed analog output signal readable in distance; an adder, adding digital pulses can similarly be connected to terminal 32 to provide a digital distance output signal. The circuit comprising elements 30a, 30a, 32a, 33a, and 34a are accessory elements and not required for function, or operation of the system, but may be desirable to obtain, additionally, not only the direct speed indication on the scales 17, 18, but additional signals for use elsewhere, for example in the system of the vehicle, or for display, storage, or recordation.

Various changes and modifications may be made within the scope of the inventive concept.

We claim:

1. Method to determine the relative speed between a first body (A) and a second body (B) in which a plurality of sensing means $(1, 2.1 \ldots 2.n)$ are secured to one of said bodies (A) and located thereon, staggered by fixed distances in the direction of relative movement of said bodies, and responsive to a characteristic of said other body (B);

in which sensed characteristic signals are derived from each said sensing means, said sensed signals being time-shifted with respect to each other in accordance with the distance (L) of said sensing means from each other, and comprising, in accordance with the invention, the steps of generating a first sensed characteristic signal $(s_1)$ from a sensing means located at the leading portion of said one body (A);

generating a plurality of second sensed characteristic signals $(s_{2.1} \ldots 2_{2.n})$ which are time shifted with respect to each other from said sensing means located at portions of said body trailing respect to said leading portion;

time-delaying said first sensed characteristic signal to obtain a delay signal $(\bar{s}_1)$;

simultaneously comparing said time delayed signal $(\bar{s}_1)$ with each of said generated characteristic signals $(s_{2.1} \ldots s_{2.n})$ and obtaining an output signal representative of optiimal correlation between said compaired signals;

and utilizing said correlation output signal to provide an indication representative of relative speed of said bodies (A, B).

2. Method according to claim 1, further comprising the steps of converting said sensed characteristic signals $(s_1, s_{2.1} \ldots s_{2.n})$ derived from said sensing means $(1, 2.1 \ldots 2.n)$ to single digit binary signals $(\bar{s}_1; \bar{s}_{2.1} \ldots \bar{s}_{2.n})$;

and wherein said comparison step comprises logically comparing said resulting single digit binary signals.

3. Method according to claim 2, further comprising the step of dynamically setting the level of association of a binary ZERO or a binary ONE value to said sensed signal characteristic by controlling the output level resulting in a binary ZERO or a binary ONE signal, as derived from said sensed characteristic signals in dependence on average signal amplitudes derived from the output of at least one of said sensing means.

4. System to determine the relative speed between the first body (A) and a second body (B), carrying out the method of claim 1, having a plurality of sensing means $(1; 2.1, 2.2, 2.n-1, 2.n)$ secured to one of said bodies (A) and located thereon, staggered by fixed distances in the direction of relative movement, each said sensing means being responsive to a characteristic of said other body (B), to derive the plurality of sensed characteristic signals from each said sensing means which are, respectively, time-shifted with respect to each other, and comprising, in accordance with the invention, a time delay means (9) connected to a first, or leading one of said sensing means (1) to obtain a delayed signal ($\bar{s}_1$);

comparator means (13) comparing said time delayed signal ($\bar{s}_1$) with each of the plurality of the time-shifted signals ($s_{2.1} \ldots s_{2.n}$) derived from sensing means located in trailing position with respect to said leading sensing means (1);

and output indicator means (14; 15, 16, 17, 18) connected to the output of said comparator means and providing an output indicative of which one of the plurality of time-shifted signals derived from a specifically located sensor, has optimum correlation with said delayed signal ($\bar{s}_1$) to thereby provide a relative speed indication.

5. System according to claim 4, wherein said comparator means comprises a plurality of logic gates (13).

6. System according to claim 5, wherein the logic gates comprise EXCLUSIVE-OR gates.

7. System according to claim 4, wherein the output indicator means includes an integrator (14) connected to the output of said comparator means.

8. System according to claim 4, further comprising a plurality of threshold circuits (3, 4), one threshold circuit being connected between the output of the leading sensing means (1) and the time delay means (9), and other respective threshold circuits (4) being connected between the output of the respective trailing sensing means (2.1 ... 2.n) and the comparator means (13).

9. System according to claim 8, wherein the threshold levels of said threshold circuits (3, 4) are adjustable or controllable.

10. System according to claim 9, further comprising an averaging circuit (5, 6; 5a) connected to the output of at least one of said sensing means and providing a time averaged signal representative of average output level derived from said at least one sensing means;

said time averaged output signal being connected to said threshold circuits (3, 4) to control the threshold level thereof.

11. System according to claim 10, wherein the time averaging circuit comprises an averaging circuit (6) and a threshold level control circuit (6) connected to control the threshold level of said threshold circuits (3, 4).

12. System according to claim 10, wherein said time averaging circuit comprises an integrator (5a) connected to the output of one (1) of said sensing means (1; 2.1 ... 2.n) and having long time integrating characteristics, the output of said integrating circuit being connected to control the threshold level of said threshold circuits (3, 4).

13. System according to claim 4, wherein the time delay means (9) is a variable time delay means, the time delay being externally controllable.

14. System according to claim 4, wherein said time delay means comprises a shift register (9).

15. System according to claim 14, further comprising means (25, 26; 22, 24) connected to said shift register and controlling the shift rate of said shift register, to thereby provide relative speed indications in various settable ranges.

16. System according to claim 15, further comprising means (19, 20, 21, 22) connected to said shift register rate control means (25, 26, 22, 24) and automatically controlling the shift rate of said shift register in dependence on output speed indication with respect to actual relative speed.

17. System according to claim 17, wherein said automatic rate controlling means comprises a bi-directional shift register (21) having two inputs, one of said inputs being connected to the output indicator means (14, 15, 16) representative of lowest speed, and the other input (20) to said bi-directional shift register being representative of highest speed, shifting of signals in said shift register being controlled by one or the other of said outputs to shift towards the opposite direction;

the means controlling the shift rate of the time delay shift register (9) including means (25, 26) providing a plurality of different clock rates (fo; fo/2; fo/4; fo/8) to said time delay shift register, the output of said bi-directional shift register controlling which one of said clock rates being connected to said time delay shift register (9).

18. System according to claim 17, including overflow buffers (27) connected to the overflow output terminals of said bi-directional shift register to hold a predetermined signal value in said overflow buffer in case of overflow of said bi-directional shift register, and for startup of the system.

19. System according to claim 17, further comprising a converter stage (30a, 31a) connected to the output indicator means (14; 15–18) and to the output of said bi-directional shift register (21) to derive an output signal representative of relative speed.

20. System according to claim 4, wherein said output indicator means includes an integrator (14), said integrator comprising a R/C circuit.

21. Method to determine relative ground speed of a moving vehicle or aircraft, comprising the method of claim 1, wherein the sensing means is responsive to surface characteristics of the ground over which said vehicle, or aircraft moves.

22. Ground speed measuring system for vehicles or aircraft comprising the apparatus of claim 4, said sensing means being located on said vehicle or longitudinally with respect to the direction of movement of said vehicle or aircraft and being responsive to surface characteristics over the ground, said ground forming said other body (B).

* * * * *

UNITED STATES PATENT AND TRADEMARK OFFICE
CERTIFICATE OF CORRECTION

PATENT NO. : 4,135,155
DATED : January 16, 1979
INVENTOR(S) : Albin KEHL et al

It is certified that error appears in the above-identified patent and that said Letters Patent are hereby corrected as shown below:

column 8, claim 1, line 38, "trailing respect" should be -- trailing with respect -- line 45, "optiimal" should be -- optimal -- column 10, claim 17, change "17" to -- 16 --

Signed and Sealed this

Third Day of April 1979

[SEAL]

Attest:

RUTH C. MASON
Attesting Officer

DONALD W. BANNER
Commissioner of Patents and Trademarks